United States Patent
Nixon

(10) Patent No.: US 6,695,124 B2
(45) Date of Patent: Feb. 24, 2004

(54) BELT CONVEYOR ASSEMBLY FOR CHAMBER PACKAGING MACHINES

(75) Inventor: John Scott Nixon, Independence, MO (US)

(73) Assignee: Koch Equipment LLC, Kansas City, MO (US)

( * ) Notice: Subject to any disclaimer, the term of this patent is extended or adjusted under 35 U.S.C. 154(b) by 0 days.

(21) Appl. No.: 10/205,042

(22) Filed: Jul. 24, 2002

(65) Prior Publication Data

US 2004/0016625 A1 Jan. 29, 2004

(51) Int. Cl.[7] .................. B65G 15/26; B65G 17/28; B65G 21/10; B65G 21/14; B65G 37/00
(52) U.S. Cl. .................. 198/588; 198/813; 198/841
(58) Field of Search .................. 198/588, 813, 198/816, 804, 841

(56) References Cited

U.S. PATENT DOCUMENTS

| | | | | |
|---|---|---|---|---|
| 1,837,276 A | * | 12/1931 | Levin | 198/841 |
| 3,456,776 A | * | 7/1969 | Viene | 198/813 |
| 4,007,827 A | * | 2/1977 | Mattos | 198/813 |
| 4,925,009 A | * | 5/1990 | Hill | 198/841 |
| 5,022,514 A | * | 6/1991 | Lofberg | 198/813 |
| 5,904,240 A | * | 5/1999 | Pax et al. | 198/841 |
| 6,509,533 B1 | * | 1/2003 | Tanaka et al. | 177/126 |

\* cited by examiner

*Primary Examiner*—Gene O. Crawford
(74) *Attorney, Agent, or Firm*—Hovey Williams LLP

(57) ABSTRACT

A chamber-type vacuum packaging machine (20) equipped with a conveyor assembly (28) is provided which has increased productivity and ease of use inasmuch as the assembly (28) permits rapid assembly-line transfer of packages between the loading station (52) and the sealing station (60) of the machine (20). The assembly (28) includes a continuous belt (90) presenting an upper run (94) and a lower run (96) together with end-mounted roller assemblies (98, 100) which support the belt (90) and permit selective shifting of the upper run (94) between the stations (52, 60) in order to transfer loaded packages to be sealed to the sealing station (60). In order to facilitate mounting of the assembly (28) and periodic breakdown thereof for cleaning and/or replacement of belt (90), the assembly (28) is configured so that the upper and lower runs (94, 96) are both located atop the table (24) of the machine (20). Optional upper and lower plate assemblies (168, 170) having low-friction undulating surfaces are preferably located atop table (24) and between the runs (94, 96) of the belt (90). The assembly (28) may also be used on a variety of elongated table processing or handling machines (178). A double-chamber vacuum packaging machine (182) is also provided having a continuous conveyor assembly (184) on the assembly (28).

18 Claims, 6 Drawing Sheets

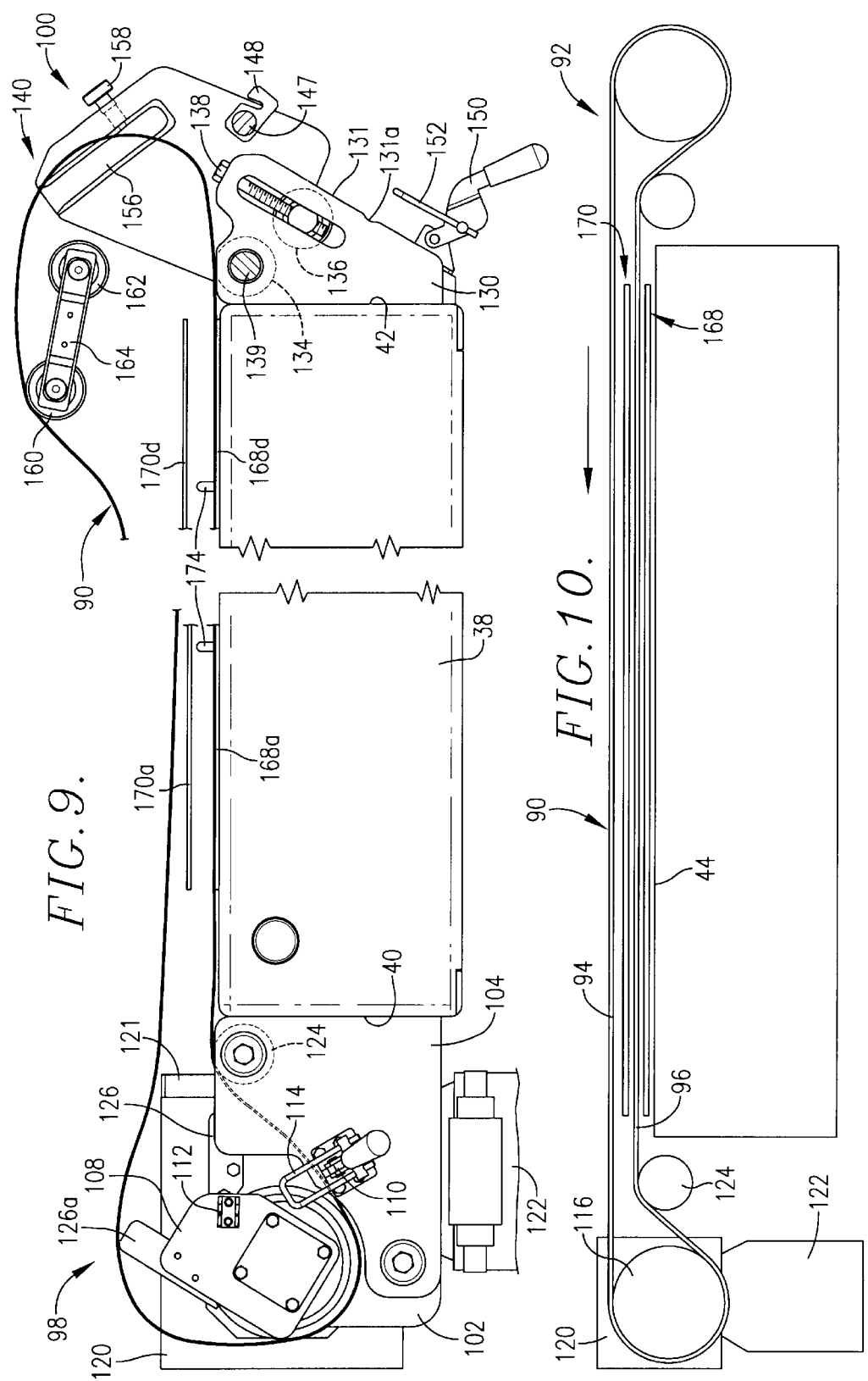

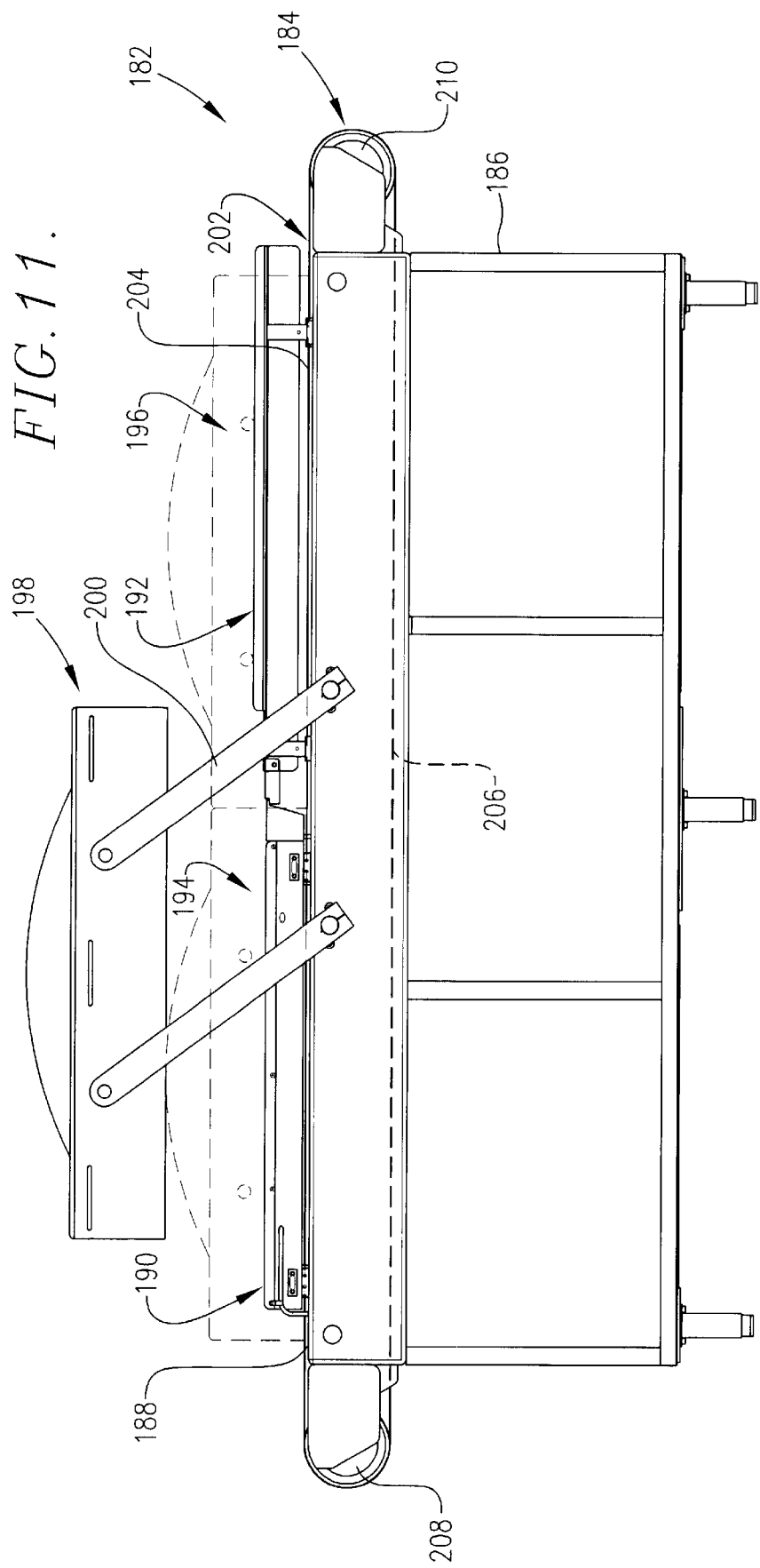

BELT CONVEYOR ASSEMBLY FOR CHAMBER PACKAGING MACHINES

BACKGROUND OF THE INVENTION

1. Field of the Invention

The present invention is broadly concerned with improved chamber-type vacuum packaging machines and conveyor assemblies adapted for use with such machines and in a variety of other contexts as well. More particularly, the invention pertains to conveyor assemblies each including a continuous shiftable conveyor belt adapted to extend along the length of a chamber or other type of machine operating table and having an upper and a lower run; a belt supporting and shifting assembly is provided for supporting the belt with both the upper and lower runs being located atop the machine table and is operable for shifting of the belt so that the upper run thereof may be selectively moved into and out of the package sealing station of the table. In other aspects, the invention relates to double chamber packaging equipment having a continuous conveyor system.

2. Description of the Prior Art

Chamber-type vacuum packaging machines have long been used in the packaging industry, particularly in connection with the packaging of food products or medical items. Broadly speaking, such machines include a table presenting a package sealing station, together with a chamber lid shiftable between an open position spaced from the table and a closed, package-sealing position adjacent the sealing station of the table. The machines also have a vacuumization assembly for drawing a package-evacuating vacuum within the lid in the closed position thereof, as well as a sealing device for selectively sealing the evacuated package.

Chamber machines of this character can be simple cabinet units or have an elongated work table allowing loading of packages adjacent one end of the table and subsequent movement of the loaded packages along the table to a sealing station. A further variation is the provision of so-called double chamber machines having an elongated work table with a pair of sealing stations and a single chamber lid alternately movable between the respective sealing stations. A highly successful machine of this type is commercialized by Koch Equipment LLC of Kansas City, Mo. under the trademark Ultravac® 3000.

Elongated work table single chamber machines of the type described above are typically not provided with conveyor assemblies and no known double-chamber machines include continuous conveyor systems. This is because the expense of providing a conveyor with associated drives and the like would very significantly increase the machine cost. However, it is generally recognized that the machine throughput could be materially enhanced if a low-cost conveyor system could be devised, and particularly one which could be readily retrofitted to existing chamber machines.

SUMMARY OF THE INVENTION

The present invention overcomes the problems outlined above and provides improved chamber-type packaging and other equipment having a simplified and relatively low cost conveyor assembly which can be retrofitted to existing equipment or form a part of new units. The conveyor assemblies give enhanced machine operation and throughput, while nevertheless permitting ready belt removal for cleanup purposes.

Broadly speaking, the conveyor assemblies of the invention are adapted inter alia for use with chamber-type vacuum packaging machines having an elongated operating table presenting a package sealing station and a shiftable chamber lid. The conveyor assemblies each have a continuous shiftable conveyor belt of a length to extend along the length of the operating table and present an upper and a lower run. A belt supporting and shifting assembly is also provided which is adapted for coupling to the machine table in order to support the belt with both the upper and lower runs thereof located atop the table; moreover, apparatus is provided for selective shifting of the belt so that the upper run thereof may be moved into and out of the package sealing station. By orienting the conveyor belt with the upper and lower runs thereof atop the table, the entire conveyor assembly can be readily attached to an existing packaging machine without the need for extensive modifications thereof. In like manner, this belt orientation facilitates belt removal for cleanup purposes or belt replacement.

In preferred forms, the belt supporting and shifting assembly comprises a pair of roller units respectively adapted for coupling to the machine table adjacent opposite ends thereof. Each of the roller units includes at least one rotatable roller with the conveyor belt being trained about each such rotatable roller. Preferably, one of the roller units includes a driven a roll to effect the desired shifting of the conveyor belt. A roller unit drive is also provided which is separate from the normal packaging machine drive, which again simplifies the overall system by eliminating any requirement for coupling the conveyor system with the machine drive. In order to facilitate belt removal at least of the roller units (and preferably both) include a roller support movable between a first belt-supporting position and a second belt-releasing position. To this end, it is preferred that the roller units each include a selectively releasable clamp for maintaining the roller unit in the first belt-supporting position thereof, with the clamp being releasable so as to permit movement of the associated roller unit to the second belt-releasing position thereof.

In order to assure smooth belt movement optional first and second slide plate assemblies may be provided. That is, it has been found that a first plate assembly situated directly atop the machine table below the lower belt run, and a second plate assembly located between the upper and lower belt runs, prevent belt hangup and undue drag. Preferably, the plate assemblies are made up of multiple plates which can be readily manipulated, with each of the plates being retained in position by means of upstanding table-mounted pins received within apertures provided in the plates. In one preferred embodiment, each plate assembly is made up of four individual metallic plates presenting undulating upper low-friction belt-engaging surfaces.

The conveyor assemblies of the invention can be used to good effect with single or double chamber machines, i.e., machines having both one and two sealing stations. In either case, the provision of a simplified conveyor assembly in accordance with the invention is a decided operational advantage. More broadly, the conveyor assemblies may be used with virtually any type of elongated, bed-type processing or handling machine or equipment.

BRIEF DESCRIPTION OF THE DRAWINGS

FIG. 5 is a fragmentary vertical sectional view taken along line 5—5 of FIG. 2;

FIG. 6 is a fragmentary top view depicting the retaining pin arrangement used for locating and securing the slide plates of the invention;

FIG. 9 is a side view similar to that of FIG. 7, but illustrating the steps involved in removing the conveyor belt for cleaning or replacement; and FIG. 10 is a schematic side view of a generalized elongated bed machine or equipment showing use of the preferred conveyor assembly in association therewith; and FIG. 11 is a schematic side view of a double-chamber packaging machine including a continuous conveyor assembly.

DETAILED DESCRIPTION

Figure 1:
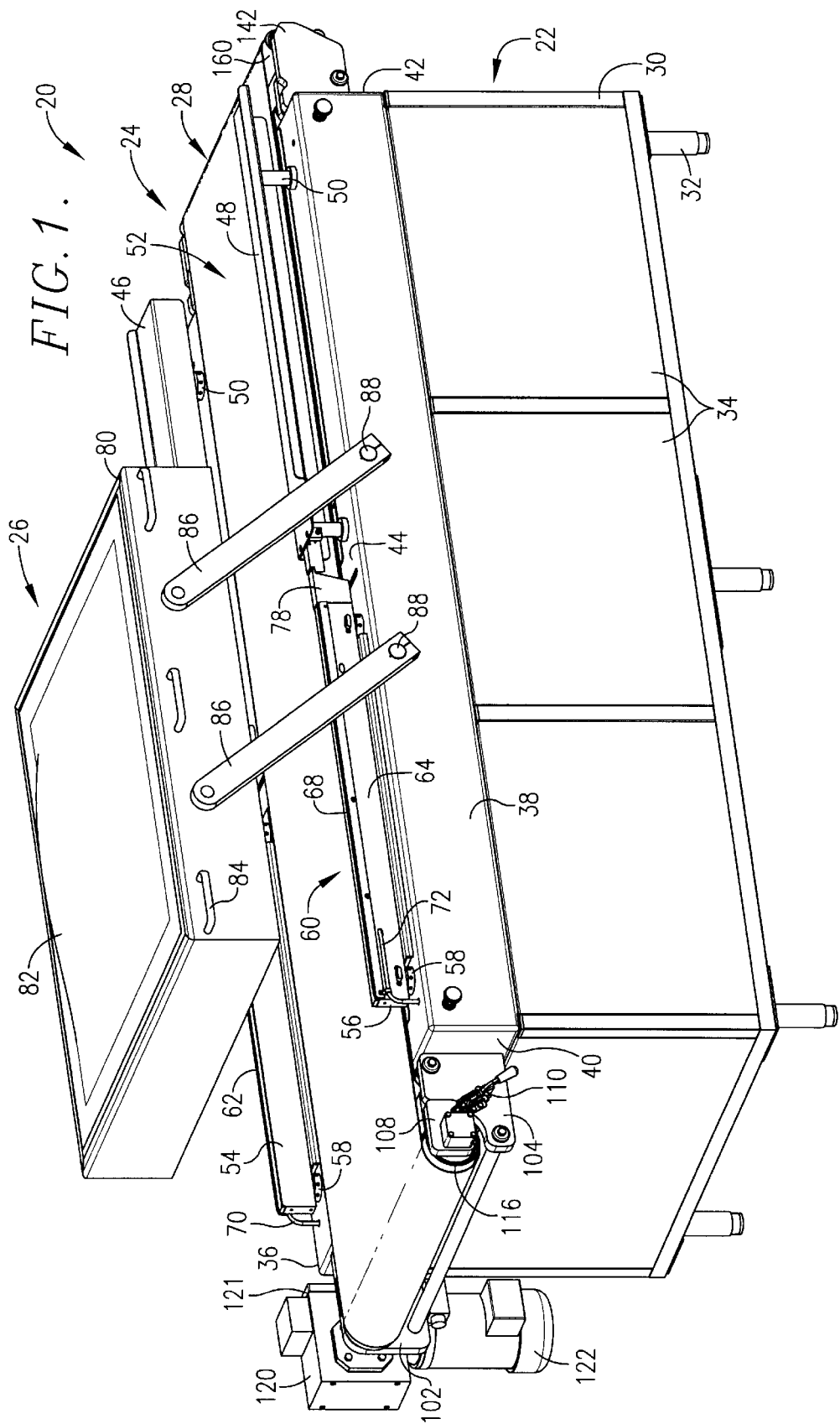
FIG. 1 is a perspective view of a chamber-type vacuum packing machine equipped with the conveyor assembly of the invention.

Turning now to the drawings, it will be seen that a packaging machine 20 in accordance with the invention includes a lower machine frame assembly 22, a packaging table 24 atop frame assembly 22, a chamber lid 26, and a conveyor assembly 28. The machine 20 is designed to receive open packages (typically in the form of open-ended bags) to permit filling thereof with food or other items, and to thereafter evacuate the filled packages and to seal the open ends thereof. Thereafter, the sealed packages are removed from the machine 20 for downstream processing.

In more detail, the frame assembly 22 includes an upright cabinet 30 supported on spaced legs 32 and surmounted by table 24. The cabinet 30 houses power and control apparatus for the machine 20, including a pair of vacuum pumps (not shown) used during vacuumization of packages as well as heater controls for selective heating of the lid sealing bar (also not shown). As illustrated, the cabinet 30 includes a series of panels 34 which can be removed or opened to allow access to the interior of the cabinet.

Figure 2:
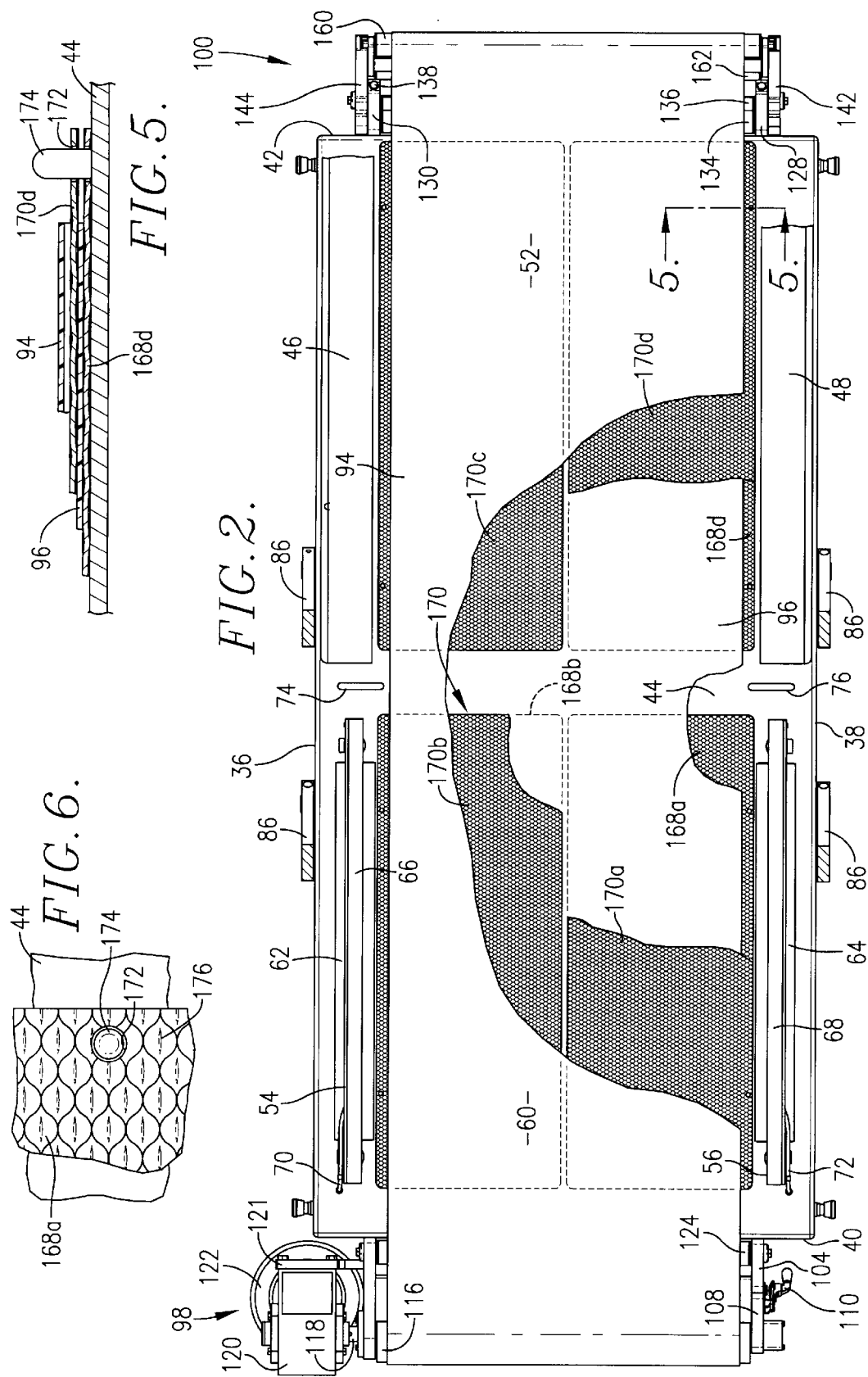
FIG. 2 is a top view with parts broken away of the machine of FIG. 1, illustrating the placement of the belt runs and slide plates.

The table 24 is in the form of a formed metallic body and includes a pair of elongated, fore and aft extending side rail sections 36, 38, as well as endmost, transversely extending cross rail sections 40 and 42. A substantially flat metallic (e.g., stainless steel) deck 44 extends between the side rail sections 36, 38 and cross rail sections 40, 42, and defines the operating surface of the machine 20. A pair of elongated, opposed loading rails are secured to deck 44 by upstanding mounts 50, and have upper panel shelves adapted to receive the ends of a package such as an open bag. The rails 46, 48 thus define a package loading zone 52 adjacent the right hand end of table 24 as viewed in FIGS. 1 and 2. Similarly, a pair of elongated, opposed package sealing rails 54, 56 are mounted on deck 44 at the left hand end thereof via mounts 58 and cooperatively define a sealing station 60. Each sealing rail 54, 56 includes an elongated pneumatic bladder 62, 64 and an upper non-heated sealing bar 66, 68 supported by a corresponding bladder 62,64. The bladders are inflated by means of pneumatic conduits 70, 72 coupled thereto and to a source of pressurized air (not shown). The deck 44 is equipped with two vacuum ports 74, 76 within the sealing zone 60. As best seen in FIG. 1, a spring-loaded transition bracket 78 is provided between the adjacent ends of each rail pair 48, 56 and 50, 54 so as to present a continuously supported path of travel for packages processed by machine 20.

Chamber lid 26 is in the form of a box-like frame 80 having a domed, transparent top 82 and manual operating handles 84. The lid is shiftably mounted by means of four swing arms 86 pivotally mounted two per side to the side frames 36, 26 through shafts 88, and to frame 80. Although not shown, a piston and cylinder assembly within frame assembly 22 is coupled to one of the arm shafts 88 for opening and closing of the chamber lid 26 in timed relation during machine operation. The lid frame 80 also carries a pair of elongated, side marginal electric resistance sealing bars which are located to mate with the bars 66, 68 upon closing of chamber lid 26.

The conveyor assembly 28 broadly includes an elongated, continuous conveyor belt 90 as well as a belt supporting and shifting assembly broadly referred to by the numeral 92. The belt 90, when operationally installed on the machine 20, presents an upper horizontal run 94 as well as a lower horizontal run 96. As illustrated for example in FIG. 8, both of the runs 94, 96 are positioned atop deck 44. The assembly 92 includes a pair of roller units 98, 100, mounted on cross rail sections 40 and 42, respectively; each roller unit 98, 100 is equipped with rotatable roller(s) so that the belt 92 is trained about the roller(s).

Figure 4:
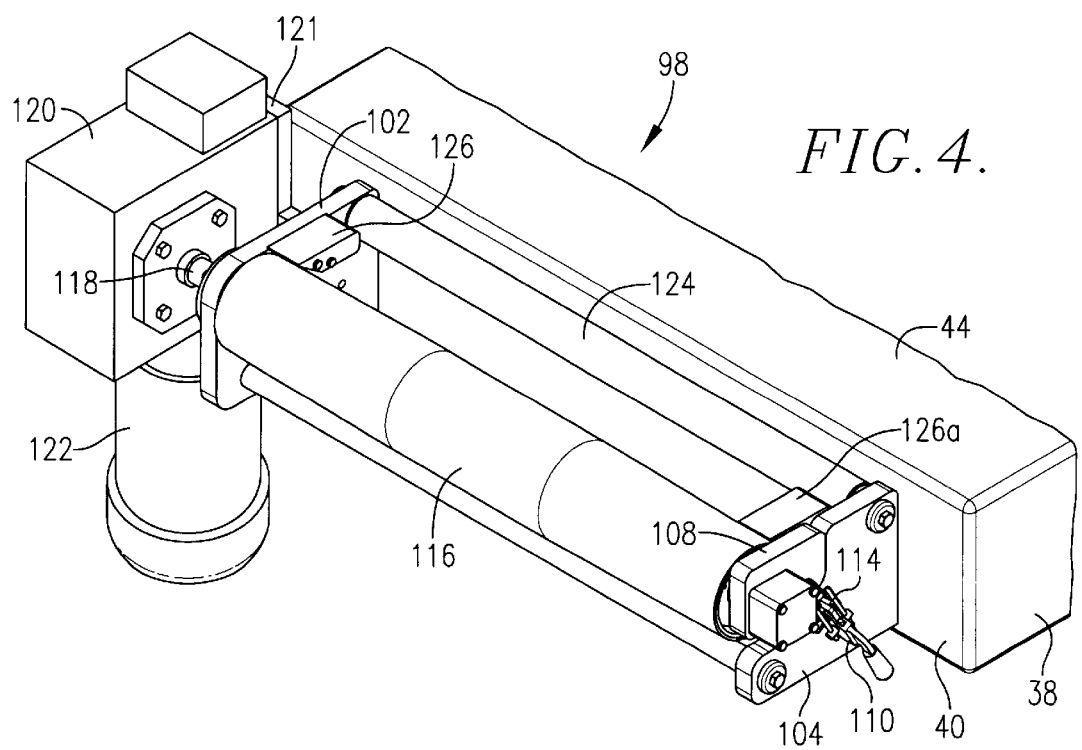
FIG. 4 is a fragmentary, perspective, partially exploded view illustrating the opposite belt-supporting roller unit.
Figure 7:
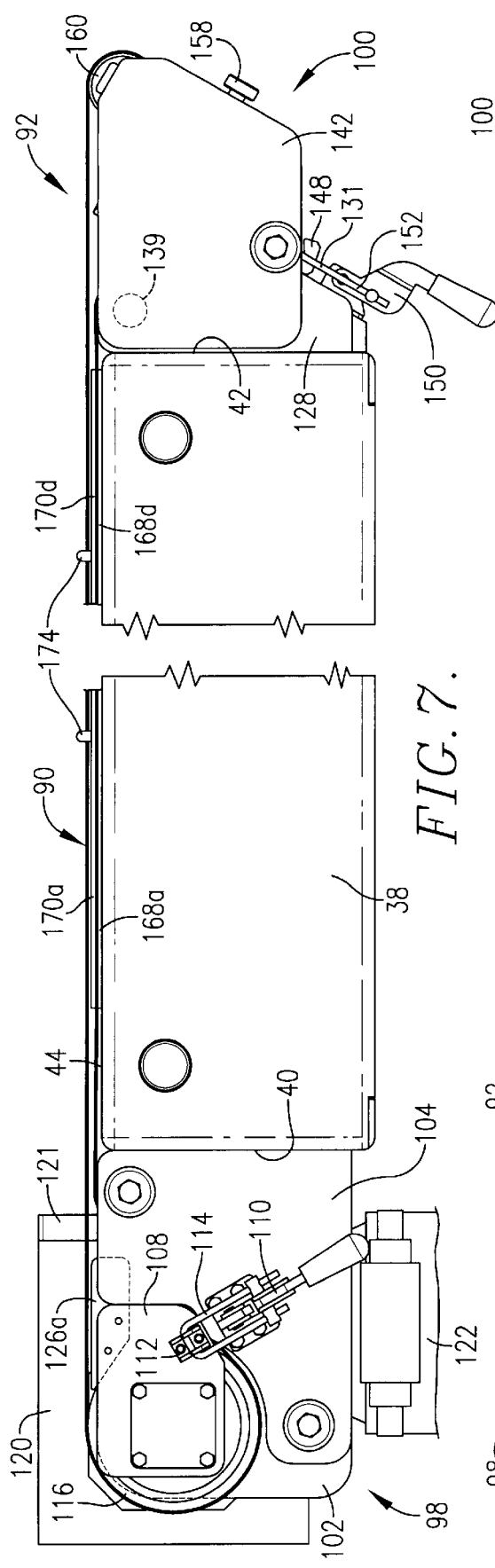
FIG. 7 is a fragmentary side view of the machine of FIG. 1, illustrating in detail the construction of the respective end-mounted roller units.

In more detail, the roller unit 98 (see FIG. 4) includes a pair of stationery, laterally spaced apart mounting brackets 102, 104 secured to cross rail 40 through fasteners 106. The bracket 104 supports a roller mounting block 108 as well as a hook-type pivoting latch 110. The block 108 is equipped with a somewhat U-shaped coupler 112 whereas the latch 110 has an elongated bail 114. In normal operation the bail 114 is received within coupler 112 as shown in FIG. 7 so as to retain block 108.

An elongated driving roller 1 16 extends between and is rotationally supported by the bracket 102 and block 108. The roller 116 has a drive shaft 118 extending through bracket 102 which is coupled with gear box 120 affixed to mounting plate 121; an electric drive motor 122 is in turn operatively connected to gear box 120. In this fashion, the roller 116 can be appropriately driven so as to shift belt 90 as will be explained. The overall roller unit 98 also includes an idler roller 124 which is rotationally supported by brackets 102 and 104. Finally, retainers 126, 126a are respectively secured to the inner face of bracket 102 and block 108, and have a trailing surface adjacent roller 116.

Figure 3:
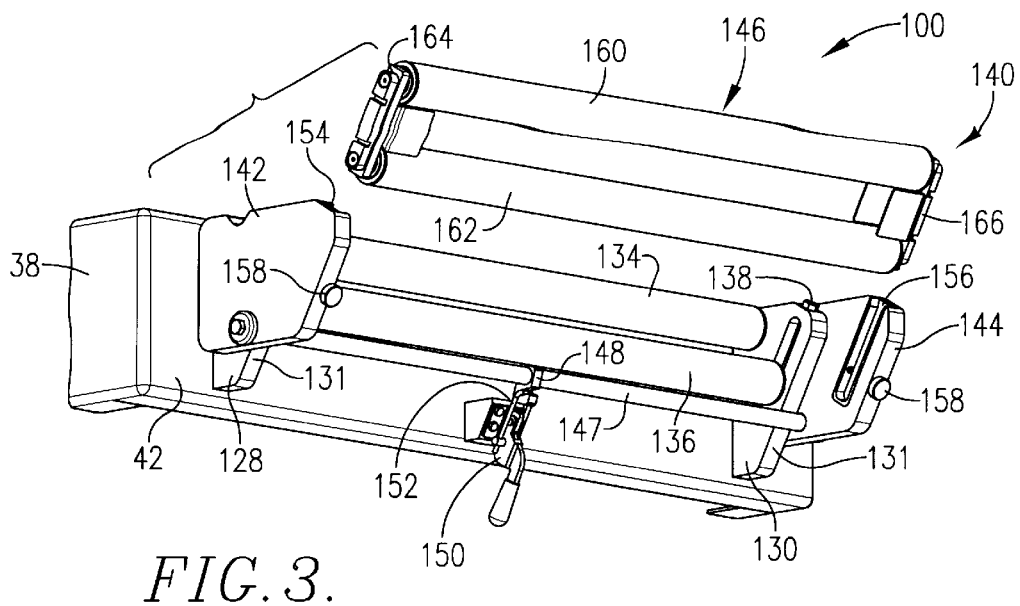
FIG. 3 is a fragmentary perspective view depicting the powered belt-supporting roller unit of the conveyor assembly.

The roller unit 100 (FIG. 3) is mounted to cross rail section 42 and has a pair of laterally spaced apart, stationery mounting brackets 128, 130 secured thereto by means of fasteners 132 and each having an oblique outer surface 131 and a mounting depression 131a. A pair of idler rollers 134, 136 are supported between the brackets 128, 130, with the roller 136 being adjustably positioned through adjustment screws 138 on each of the brackets; the upper roller 134 is rotatable about and innermost shaft 139. The brackets 128, 130 also support a secondary roller assembly 140 comprising a pair of outboard brackets 142, 144 and dual roller set 146.

Figure 8:
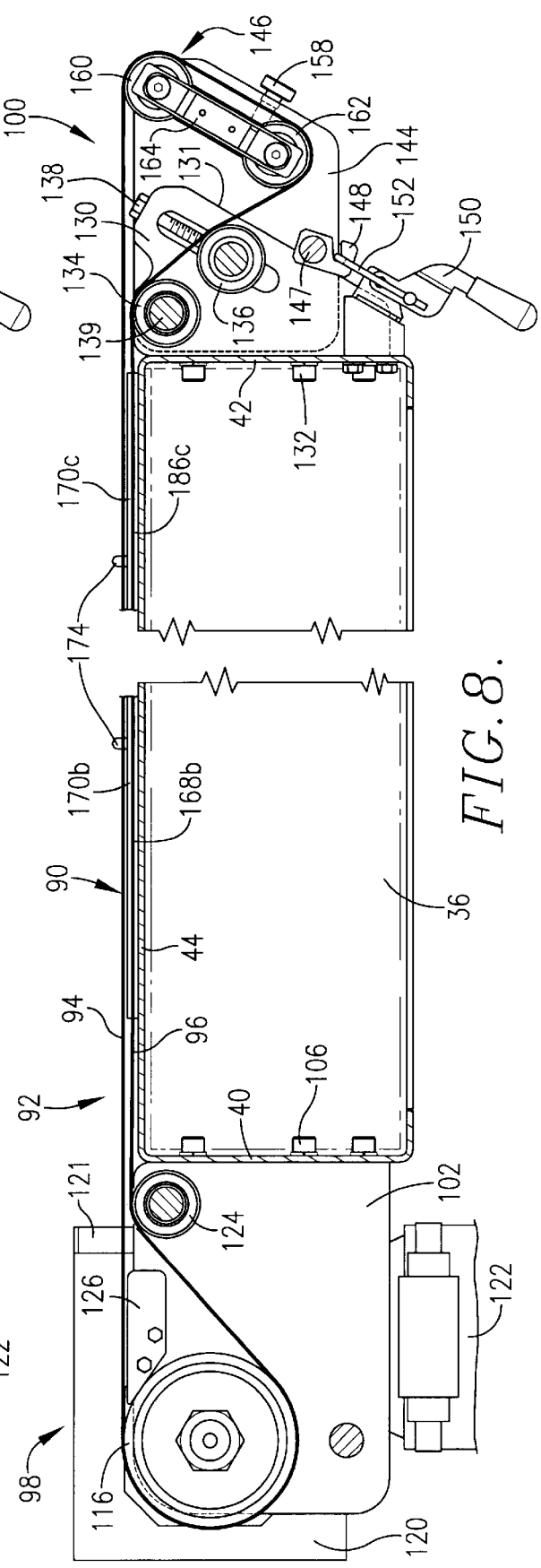
FIG. 8 is a fragmentary vertical sectional view of the FIG. 1 machine, illustrating further details of the roller units.

Specifically, the brackets 142, 144 have inner openings receiving the opposed ends of shaft 139 so that the assembly 140 may rotate relative to the stationary brackets 128, 130. An elongated, rigid transverse mounting rod 147 extends between the brackets 142, 144 and is designed to seat within the depressions 131*a*, and has a central U-shaped coupler 148 affixed thereto. A pivotal latch 150 is attached to cross rail section 42 and includes a bail 152 configured to mate with coupler 148, thereby releasably locking the secondary roller assembly 140 in place. Each outboard bracket 142, 144 also has an oblique slot 154, 156 formed therein together with a cooperating set screw 158. The dual roller set 146 includes two rollers 160, 162 rotatably secured to endmost blocks 164, 166, the latter being received within the corresponding bracket slots 154, 156. As illustrated in FIG. 8, the belt 90 is operatively trained past idler rollers 134 and 136, and then about the rollers 162, 160 in the transition between the belt runs 94, 96.

The preferred conveyor assembly 28 also includes first and second plate assemblies 168, 170 which are respectively located on deck 44 and between the belt runs 94, 96. In particular, the lower assembly 168 includes four individual plates 168*a*–168*d* arranged so that the plates 168*c* and 168*d* are at the loading station 52 whereas the plates 168*a* and 168*b* are located at the sealing station 60. Each of these plates are equipped with pair of laterally spaced apart marginal apertures 172 (FIG. 6) which receive upstanding retainer pins 174 welded to the upper surface of deck 44. The upper plate assembly 170 overlies the assembly 168 and has four plates 170*a*–170*d*, with plates 170*c* and 170*d* being located at the loading station 52 with plates 170*a* and 170*b* at sealing station 160. The plates 170*a*–170*d* are likewise marginally apertured and retained in place by the pins 174. Preferably, all of the plates making up the assemblies 168, 170 present an undulating surface 176 to facilitate low-friction passage of the belt runs across the slide plates.

The conveyor assembly 28, when attached as a retrofit or as a part of a new machine construction, significantly enhances the production efficiency of the machine. That is, and considering FIG. 1, one or more workers will typically place one or more packages to be sealed onto loading station 52. In the case of hams within open ended packaging bags, for example, the workers would place the open ends of multiple such bags on the loading rails 46 and 48. At this point, the conveyor system is actuated so as to move the loaded but unsealed packages leftwardly to sealing station 60. At this point, the lid 26 is lowered automatically or through a manual control until the lid depresses the transition brackets 78 and comes into sealing engagement with belt run 94 and with the electrically heated sealing bars carried by the lid; the latter are in close proximity to the sealing bars 66, 68 (of course the open ends of the packages are sandwiched between the bars 66, 68 and the lid-mounted sealing bars). Next, the vacuum pumps associated with the machine 20 are actuated so as to draw a vacuum through the deck ports 74, 76, which removes air from the individual packages. In some instances, a gas flush function may be used wherein nitrogen or other inert gas is injected into the packages. In any case, the final step of the packaging operation is activation of the electric lid-mounted sealing bars, so as to effect a heat seal of the evacuated packages. The lid 26 is then raised and the completed packages can be removed from the sealing station 60. This process is then repeated, it being understood that while the described sealing operation is being carried out, additional packages will be loaded at the loading station 52.

When a shift is completed and it is necessary to clean the machine 20, or if the belt 90 needs replacement, it is a simple matter to remove the belt 20 as well as the plate assemblies 168, 170 from the machine. Referring specifically to FIG. 9, it will be seen that the latches 110 and 150 are first opened so that the bails 114 and 152 are detached from the couplers 112, 148. Thereupon, the roller 1 16 may be pivoted in a counterclockwise direction away from bracket 104, and secondary roller assembly 140 is similarly pivoted relative to the fixed brackets 128, 130. During this same sequence, the dual roller set 146 is removed from the slots 154, 156. This relieves all tension from the belt 90 and moreover provides clearance for removal of the belt from the roller units 98, 100. Of course, before the belt can be removed it is necessary to detach the plates 170*a*–170*d* from the pins 174. After machine cleaning the above procedure is reversed to make the machine 20 ready for the next shift.

The conveyor assembly 28 can be easily attached as a retrofit to an existing chamber-type packaging machine. To accomplish this, it is only necessary to secure the endmost roller units 98, 100 via threaded fasteners 106 and 132, and to similarly secure latch 150 to cross rail section 42. Also, the marginal pins 174 are welded to deck 44. Next, the lower plate assembly 168 is positioned using the pins 174, and the belt 90 is trained around the roller units 98, 100 (which are in the FIG. 9 position) and the upper plate assembly 170 is secured between the belt runs 94, 96. Finally, the roller units are reassembled and made ready for operation.

The preferred embodiment of the invention is susceptible to a number of variations without departing from the principles of the invention. Thus, the plate assemblies 168, 170 can be eliminated, or can be in the form of dual or single plates having a number of different low-friction surfaces. Likewise, the roller units 98, 100 can assume a variety of different configurations, depending upon the type of machine in question and use considerations. While the invention has been illustrated in connection with a single sealing station machine, it can also be used with double sealing station machines as well.

The conveyor assemblies of the invention can also be used to good effect on elongated bed-type machines of various types, be they packaging machines or otherwise. FIG. 10 schematically depicts a generalized machine 178 having an elongated upper bed or table 180 which would typically support handling, manipulative or processing equipment. As explained, a conveyor assembly 28 may be attached to the machine 178 as shown where certain of the exemplary component reference numbers of the FIGS. 1–9 embodiment have been employed for ease of understanding.

In addition, the invention also provides a double-chamber vacuum packaging machine 182 equipped with a continuous conveyor assembly 184 (see FIG. 11). In detail, the machine 182 has a cabinet base 186 presenting an elongated, vacuum-apertured fore and aft extending upper bed or table 188. The table 188 supports two pairs of sealing rails 190, 192. That is, each rail pair 190, 192 includes two opposed sealing rails (such as the above-describes rails 54, 56), with pair 190 being located adjacent the left hand end of table 188 while pair 192 is located adjacent the right hand table end; in this manner, the rail pairs define individual, spaced apart sealing stations 194, 196 between the respective rails thereof.

The overall machine 182 also has a sealing lid 198 pivotally supported on four linkage arms 200. The lid carries heatable sealing bars (not shown) which alternately cooperate with the sealing bar pairs 190, 192. The lid 198 is thus movable between the full line open position of FIG. 11 to the individual lowered dotted line sealing positions. It will be appreciated that in the use of machine 182, operators will sequentially load each of the sealing stations so that lid 198 may be lowered for package vacuumization and sealing purposes, much in the manner of the FIGS. 1–9 embodiment. The use of two sealing stations of course increases the capacity of the machine 182 as compared with the single chamber machine 20.

The machine 192 is also equipped with the conveyor assembly 184, including continuous conveyor belt 202 presenting upper run 204 and lower run 206, along with schematically illustrated end-mounted belt supports 208, 210. The upper run 204 lies between the opposed rails of the rail pairs 190, 192 for the full length of table 188, whereas lower run 206 passes beneath the table. Of course, the belt 202 is selectively movable via a conventional drive mechanism, not shown.

It will be understood that the depicted conveyor assembly 184 would normally be a part of an originally constructed double chamber machine. However, in such a case, or as a retrofit, the specialized conveyor assemblies such as the previously described assemblies 28 may be used. In any case, the provision of a continuous conveyor assembly 184, significantly enhances the operation and throughput of the double chamber machine 182.

I claim:

1. In a chamber-type vacuum packing machine having an elongated table presenting a package sealing station, a chamber lid shiftable between an open position spaced from said table and a closed, package-sealing position adjacent the package sealing station of said table, said lid presenting opposed, fore and aft extending sidewalls and transverse front and rear walls extending between said sidewalls, a vacuumization assembly for drawing a package-evacuating vacuum within the lid in the closed position thereof, and a sealing device for package sealing, the improvement which comprises:

a continuous shiftable conveyor belt extending along the length of said table and having an upper run and a lower run, said belt presenting a width with opposed side margins; and a belt supporting and shifting assembly supporting said belt with both said upper and lower runs located atop said table and operable for shifting of the belt so that the upper run thereof may be selectively moved into and out of said package sealing station, said lid sidewalls being spaced apart a distance greater than said belt width so that, when said lid is in said package-sealing position thereof, each of said sidewalls are outboard of the adjacent belt side margin and said front and rear walls come into sealing engagement with said upper run.

2. The machine of claim 1, including a swing arm assembly operable coupling said lid to said table.

3. The machine of claim 1, said vacuumization assembly comprising at least one vacuum port proximal to said packaging sealing station, said port communicating with said lid when the latter is in said closed position thereof.

4. The machine of claim 1, said sealing device comprising a heat sealing member.

5. The machine of claim 1, said belt supporting and shifting assembly comprising a pair of roller units respectively located adjacent opposite ends of said table, each of the roller units including at least one rotatable roller, said belt being trained about each such rotatable roller.

6. The machine of claim 5, one of said roller units being driven to effect said selective shifting of the belt.

7. The machine of claim 5, at least one of the roller units including a roller support movable between a first belt-supporting position and a second belt-releasing position.

8. The machine of claim 7, said at least one roller unit including a selectively releaseable clamp for maintaining said at least one roller unit in said first position thereof, the clamp releaseable so as to permit movement of the at least one roller unit to the second position thereof.

9. The machine of claim 1, further including a first slide plate assembly resting atop said table below said lower belt run.

10. A The machine of claim 9, said table presenting a package loading station spaced from said package sealing station, said first slide plate assembly comprising four individual plates, two of said plates being located at said package loading station, with the remaining two said plates being located at said packaging sealing station.

11. The machine of claim 9, further including a second slide plate assembly located between said upper and lower belt runs.

12. The machine of claim 11, said first and second slide plate assemblies each presenting an undulating upper surface.

13. The machine of claim 11, said second slide plate assembly including four individual plates, two of said plates being located at said package loading station, with the remaining two said plates being located at said packaging sealing station.

14. The machine of claim 11, including fastening apparatus for holding said first and second slide plate assemblies in place.

15. The machine of claim 14, said fastening apparatus comprising upstanding pins, each of said first and second slide plate assemblies having apertures receiving said pins.

16. In a double-chamber packaging machine having an elongated table presenting a pair of spaced apart package sealing stations, a chamber lid shiftable between an open position spaced from the table and a pair of closed, package sealing positions adjacent each of the sealing station, said lid presenting opposed, fore and aft extending sidewalls and transverse front and rear walls extending between said sidewalls, a sealing device for package sealing, the improvement which comprises shiftable conveyor system including a continuous conveyor belt having an upper run located atop and extending along the length of said table between said sealing stations, said belt presenting a width with opposed side margins and a belt supporting and shifting assembly operatively coupled with said continuous belt, said lid sidewalls being spaced apart a distance greater than said belt width so that, when said lid is in either of said package-sealing positions thereof, each of said sidewalls are outboard of the adjacent belt side margin and said front and rear walls come into sealing engagement with said upper run.

17. The machine of claim 16, said belt having a lower run extending beneath said table.

18. The machine of claim 16, said belt having both an upper run and a lower run, with both of said runs being located atop said table.

* * * * *